(12) United States Patent
Ye et al.

(10) Patent No.: US 12,199,476 B2
(45) Date of Patent: Jan. 14, 2025

(54) GREASE-ISOLATING STORAGE STRUCTURE FOR CIRCUIT BOARD, AND SOLAR ACTUATOR

(71) Applicant: ZHEJIANG JIECANG LINEAR MOTION TECHNOLOGY CO., LTD., Zhejiang (CN)

(72) Inventors: Long Ye, Zhejiang (CN); Ye Luo, Zhejiang (CN)

(73) Assignee: ZHEJIANG JIECANG LINEAR MOTION TECHNOLOGY CO. LTD., Zhejiang (CN)

( * ) Notice: Subject to any disclaimer, the term of this patent is extended or adjusted under 35 U.S.C. 154(b) by 267 days.

(21) Appl. No.: 17/797,436

(22) PCT Filed: Aug. 22, 2021

(86) PCT No.: PCT/CN2021/113930
§ 371 (c)(1),
(2) Date: Aug. 4, 2022

(87) PCT Pub. No.: WO2022/052793
PCT Pub. Date: Mar. 17, 2022

(65) Prior Publication Data
US 2023/0107545 A1 Apr. 6, 2023

(30) Foreign Application Priority Data

Sep. 10, 2020 (CN) .......................... 202010945210.3

(51) Int. Cl.
*H02K 11/20* (2016.01)
*F24S 20/60* (2018.01)
(Continued)

(52) U.S. Cl.
CPC .............. *H02K 11/20* (2016.01); *F24S 20/60* (2018.05); *F24S 30/42* (2018.05); *F24S 50/20* (2018.05);
(Continued)

(58) Field of Classification Search
CPC . F24S 20/60; F24S 30/42; F24S 50/20; H02S 20/32; H02S 40/38; H02S 50/00; H02K 2211/03
See application file for complete search history.

(56) References Cited

U.S. PATENT DOCUMENTS

| 4,425,899 A | 1/1984 | Kato et al. |
| 2018/0038472 A1* | 2/2018 | Heipt ................... F16H 57/031 |
| 2020/0047847 A1 | 2/2020 | Chang et al. |

FOREIGN PATENT DOCUMENTS

| CN | 206442252 | 8/2017 |
| CN | 108347128 | 7/2018 |

(Continued)

OTHER PUBLICATIONS

"International Search Report (Form PCT/ISA/210) of PCT/CN2021/113930," mailed on Nov. 24, 2021, with English translation thereof, pp. 1-4.

(Continued)

*Primary Examiner* — Thanh Luu
(74) *Attorney, Agent, or Firm* — JCIPRNET

(57) ABSTRACT

Disclosed is a grease-isolating structure for storing a circuit board, the structure being disposed in an outer tube of a solar actuator, in the outer tube being further provided the circuit board, a through-hole running axially through the outer tube being provided for the outer tube, wherein a cavity for storing the circuit board is provided on a wall of the outer tube, the cavity and the through-hole being isolated from (Continued)

each other. Further disclosed is a solar actuator in which the circuit board storage structure is provided.

14 Claims, 2 Drawing Sheets

(51) Int. Cl.
*F24S 30/42* (2018.01)
*F24S 50/20* (2018.01)
*H02K 7/06* (2006.01)
*H02K 11/00* (2016.01)
*H02K 11/33* (2016.01)
*H02S 20/32* (2014.01)
*H02S 40/38* (2014.01)
*H02S 50/00* (2014.01)

(52) U.S. Cl.
CPC .......... *H02K 7/06* (2013.01); *H02K 11/0094* (2013.01); *H02K 11/33* (2016.01); *H02K 2211/03* (2013.01); *H02S 20/32* (2014.12); *H02S 40/38* (2014.12); *H02S 50/00* (2013.01)

(56) References Cited

FOREIGN PATENT DOCUMENTS

| | | |
|---|---|---|
| CN | 207703309 | 8/2018 |
| CN | 109322451 | 2/2019 |
| CN | 208832072 | 5/2019 |
| CN | 209489038 | 10/2019 |
| CN | 112235990 | 1/2021 |
| CN | 213403874 | 6/2021 |

OTHER PUBLICATIONS

"Office Action of China Counterpart Application", issued on Apr. 25, 2024, p. 1-p. 7.
"Search Report of Europe Counterpart Application", issued on Jul. 24, 2023, p. 1-p. 9.
"Office Action of China Counterpart Application", issued on Aug. 14, 2024, with English translation thereof, p. 1-p. 8.

* cited by examiner

GREASE-ISOLATING STORAGE STRUCTURE FOR CIRCUIT BOARD, AND SOLAR ACTUATOR

CROSS-REFERENCE TO RELATED APPLICATION

This application is a 371 of international application of PCT application serial no. PCT/CN2021/113930, filed on Aug. 22, 2021, which claims the priority benefit of China application no. 202010945210.3, filed on Sep. 10, 2020. The entirety of each of the above mentioned patent applications is hereby incorporated by reference herein and made a part of this specification.

FIELD

The disclosure relates to industrial optothermal solar actuators, and more particularly relates to a grease-isolating structure for storing a circuit board, and a solar actuator.

BACKGROUND

An electric actuator, which is also referred to as a linear actuator, works mainly following this principle: an electric motor actuates a drive screw to rotate, and rotation of the drive screw drives a nut provided thereon to move reciprocally.

With constant development of solar technologies, solar actuators emerge in the market, which are a combination of solar technologies and electric actuators. The solar actuators typically have a circuit board mainly for feeding back information and controlling a Hall effect switch, whereby to ensure normal operation of the actuator. However, conventional solar actuators have some drawbacks. For example, during the service, the circuit board in the interior of the solar actuator is likely immersed by liquidized grease, inducing a capillary action to the circuit board. The capillary action would affect the circuit board in information feedback and Hall switch control, which in turn causes malfunction of the solar actuator and dampens user experience. In addition, it takes considerable time to address the problems occurring to the interior circuit board, which also brings significant inconvenience to the user. The malfunctional circuit board would also affect the service life of the solar actuator and increase the user's expense in handling its faults.

SUMMARY

A grease-isolating structure for storing a circuit board is provided, which may isolate the circuit board from grease, whereby to minimize potential occurrence of capillary action to the circuit board.

The disclosure adopts technical solutions as follows:

A grease-isolating structure for storing a circuit board is provided, the structure being disposed in an outer tube of a solar actuator, in the outer tube being further provided the circuit board, a through-hole running axially through the outer tube being provided for the outer tube, wherein a cavity for storing the circuit board is provided on a wall of the outer tube, and the cavity and the through-hole are isolated from each other.

The disclosure offers the following beneficial effects:

In the disclosure, the cavity for storing the circuit board is provided on the wall of the outer tube, wherein the cavity is isolated from the through-hole in the outer tube; during service, the circuit board is stored in the cavity. Since the cavity is isolated from the through-hole in the outer tube, the grease in the through-hole does not flow into the cavity and the circuit board is not exposed to the grease, which significantly reduces potential occurrence of a capillary action between the circuit board and the grease. The disclosure may provide a protection to the circuit board and minimize potential occurrence of the capillary act to the circuit board causing information feedback fault and Hall switch malfunction. The disclosure may provide certain guarantee for normal operation of the solar actuator and reduce potential faults occurring to the solar actuator.

In addition, since the cavity isolates the circuit from exposure to the grease, the disclosure may reduce potential faults occurring to the circuit board and meanwhile provide guarantee to normal service of the solar actuator, thereby reducing maintenance to the solar actuator and enhancing utilization of the solar actuator; in addition, due to significant reduction of the times of maintenance, potential damages to the solar actuator due to assembly and disassembly in the maintenance process may also be avoided, thereby promoting the service life of the solar actuator and reducing the user's expense in the maintenance, which may also bring a better user experience and enhance the user's assurance in using the product.

In some embodiments, the cavity runs through the outer tube in a direction consistent with that of the through-hole; the length of the cavity is identical to that of the outer tube, which allows for the circuit board to be stored at any position in the cavity, significantly facilitating signal transmission of the circuit board.

In some embodiments, a first limit bar and a second limit bar for limiting axial displacement of the circuit board along the outer tube are provided at two ends of the circuit board, respectively; the first limit bar and the second limit bar may limit axial displacement of the circuit board along the outer tube, whereby to avoid rocking-induced displacement of the circuit board during operation or transportation causing poor signal reception, or avoid damages due to collision between the circuit board and the inner wall of the cavity.

In some embodiments, cross sections of the first limit bar and the second limit bar are sized to match with that of the cavity; and the first limit bar and the second limit bar fully fill the space in the cavity at the two ends of the circuit board, which may further ensure isolation of the circuit board from the ambience, providing a further protection to the circuit board.

In some implementations, a mount base and a front end cap are provided at two ends of the outer tube, respectively; wherein two ends of the first limit bar contact the mount base and one end of the circuit board, respectively, and two ends of the second limit bar contact the front end cap and the other end of the circuit board, respectively; in this way, the first limit bar, the second limit bar, and the circuit board are fixed to prevent rocking of the circuit board during operation or transportation.

In some embodiments, the first limit bar and the second limit bar are aluminum bars.

In some embodiments, an overall cross-section of the cavity assumes a rectangular shape; and a recessed groove for limiting radial displacement of the circuit board along the outer tube is provided at two sides of the cavity, respectively. This may further prevent rocking of the circuit board during operation or transportation.

In some embodiments, the cavity is sized to match with that of the circuit board, the cavity being only for storing the circuit board.

In some embodiments, a cover for limiting the circuit board from escaping out of the cavity is further provided for the outer tube.

A solar actuator is further provided, comprising an outer tube and a circuit board, wherein a grease-isolating structure for storing a circuit board according to any of the embodiments above is provided in the outer tube.

Other features and advantages of the disclosure will be described in detail through embodiments below with reference to the accompanying drawings.

BRIEF DESCRIPTION OF THE DRAWINGS

Hereinafter, the disclosure will be further described with reference to the accompanying drawings, among which.

DETAILED DESCRIPTION

Figure 1:
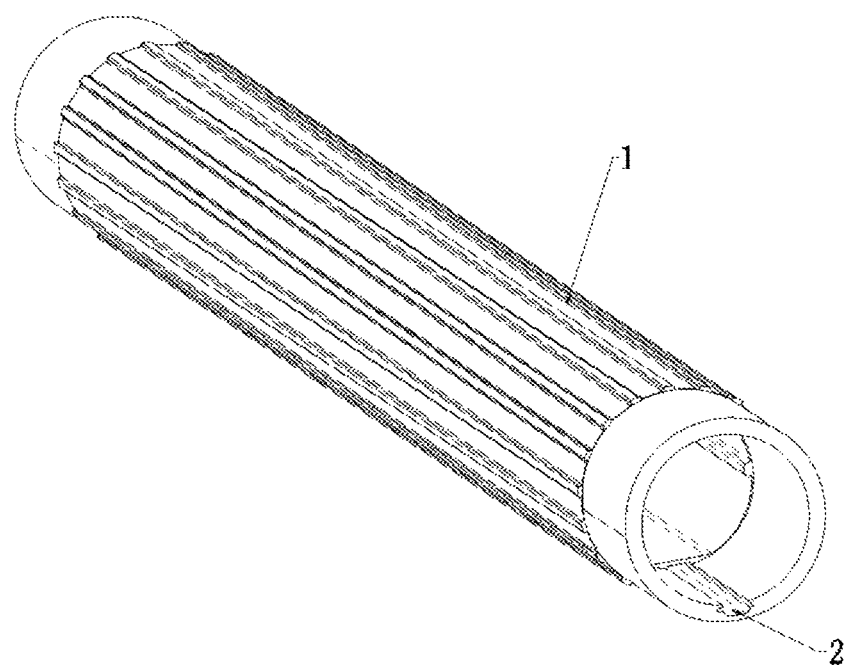
FIG. 1 is a schematic diagram showing an overall structure of an outer tube in a first embodiment of the disclosure.

Hereinafter, the technical solutions in embodiments of the disclosure will be explained and illustrated with reference to the drawings. It is noted that the embodiments described below are only preferred examples, not all of the embodiments. Other embodiments derived by those skilled in the art without exercise of inventive efforts based on the examples in the described embodiments all fall into the protection scope of the disclosure.

In the description of the present disclosure, it needs to be understood that the orientational or positional relationships indicated by the terms "center," "longitudinal," "transverse," "length," "width," "thickness", "upper," "lower," "front," "rear," "left," "right," "vertical," "horizontal," "top," "bottom," "inner," "outer," "clockwise," and "counterclockwise," etc. are orientational and positional relationships based on the drawings, which are intended only for facilitating or simplifying description of the present disclosure, not for indicating or implying that the devices or elements have to possess those specific orientations and have to be configured and operated with such specific orientations; therefore, they should not be understood as limitations to the present disclosure.

Besides, the terms "first" and "second" are only used for description purposes, which shall not be construed as indicating or implying a relative importance or implicitly indicating the number of the technical features indicated. Therefore, the features limited by "first" and "second" may explicitly or implicitly include at least one of such features. In the description of the present disclosure, "plurality" indicates at least two, for example, two, three, etc., unless otherwise indicated.

In the present disclosure, unless otherwise explicitly provided and limited, the terms such as "mount," "attach," "connect," and "fix" should be understood broadly, which, for example, may refer to a secured connection, a detachable connection, or an integral connection; which may be a mechanical connection or an electrical connection; which may be a direct connection or an indirect connection via an intermediate medium; which may also be a communication between the insides of two elements or an interactive relationship between the two elements, unless otherwise explicitly defined. To a person of normal skill in the art, specific meanings of the above terms in the present disclosure may be understood based on specific situations.

Embodiment 1

FIGS. 1 to 4 illustrate a grease-isolating structure for storing a circuit board 3. The structure is disposed in an outer tube 1 of a solar actuator. In the outer tube 1 is further provided a circuit board 3. A through-hole running axially through the outer tube 1 is provided for the outer tube 1. A cavity 2 for storing the circuit board 3 is provided on a wall of the outer tube 1, wherein the cavity 2 and the through-hole are isolated from each other.

During service, a high and low-temperature lubricating grease needs to be applied to the inner wall of the outer tube 1; since the high and low-temperature lubricating grease is very easily liquidized during operation, a large amount of liquidized grease would be present on the inner wall of the outer tube 1. In this embodiment, since the cavity 2 where the circuit board 3 is stored is provided on a wall of the outer tube 1 and isolated from the through-hole in the outer tube 1, the liquidized grease in the through-hole will not flow into the cavity 2 and the circuit board 3 will not be exposed to the grease either, which significantly decreases potential occurrence of a capillary action between the circuit board 3 and the liquidized grease. This embodiment may offer a protection to the circuit board 3. By minimizing occurrence of the capillary action to the circuit board causing information feedback fault and Hall switch malfunction, this embodiment may provide certain guarantee to normal operation of the solar actuator and reduce potential occurrence of solar actuator malfunction.

In addition, since the cavity 2 isolates the circuit board 3 from the grease, this embodiment reduces potential faults occurring to the circuit board 3 and meanwhile provides guarantee to normal operation of the solar actuator, thereby reducing maintenance of the solar actuator and enhancing utilization of the solar actuator; moreover, due to significant reduction of the times of maintenance, potential damages to the solar actuator during the maintenance process may also be avoided, thereby promoting the service life of the solar actuator and reducing the user's expense in the maintenance, which may also bring a better user experience and enhance the user's assurance in using the product.

In this embodiment, for the sake of storing the circuit board 3 flexibly, the cavity 2 runs through the outer tube 1 in a direction consistent with that of the through-hole; therefore, the storing position of the circuit board 3 may be set as desired, whereby to adjust the circuit board 3 to an optimal position for signal transmission. Therefore, this embodiment may enhance the stability of signal transmission. In addition, this embodiment brings more options in assembling the solar actuator, which lowers assembly complexity.

It is noted that in an alternative embodiment, the cavity 2 may be sized to match the circuit board 3, such that the cavity 2 serves only to store the circuit board 3; in addition, a cover for limiting the circuit board 3 from escaping out of the cavity 2 is further provided for the outer tube 1. An advantage of this embodiment lies in that the circuit board 3 has a limited space for displacement, such that even without other limit components, a relatively large offset and collision will not occur to the circuit board 3. The cavity 2 itself realizes limitation to the circuit board 3. In addition, the cover may isolate the cavity 2 from the ambience, which provides a further protection to the circuit board 3. Moreover, the structure may simplify assembly and disassembly of the circuit board 3, facilitating future maintenance.

In this embodiment, a first limit bar 4 and a second limit bar 5 for limiting axial displacement of the circuit board 3 along the outer tube 1 are provided at two ends of the circuit board 3, respectively, whereby to limit unwanted displacement of the circuit board in the cavity 2. The vibration occurring during operation or transportation likely causes axial displacement of the circuit board 3 along the outer tube 1; however, the first limit bar 4 and the second limit bar 5 provided in this embodiment may cooperate to hold the circuit board 3 therebetween, whereby to limit axial displacement of the circuit board 3. In this way, the vibration-induced displacement of the circuit board 3, which likes results in poor signal reception and affects normal operation of the solar actuator, may be avoided. In addition, potential damages to the circuit board 3 due to vibration-induced collision between the circuit board 3 and the inner wall of the cavity 2 may also be avoided. Therefore, provision of the first limit bar 4 and the second limit bar 5 further protects the circuit board 3.

In addition, in this embodiment, the cross sections of the first limit bar 4 and the second limit bar 5 are sized to match with that of the cavity 2, such that when the circuit board 3 is held between the first limit bar 4 and the second limit bar 5, the first limit bar 4 and the second limit bar 5 would fully fill the space in the two ends of the circuit board 3, whereby to further prevent the external grease from entering the space where the circuit board 3 is located to access the circuit board 3.

To further limit displacement of the circuit board 3, a mount base and a front end cap are provided at two ends of the outer tube 1, respectively; wherein the two ends of the first limit bar 4 contact the mount base and one end of the circuit board 3, respectively, and the two ends of the second limit bar 5 contact the front end cap and the other end of the circuit board 3, respectively. In this way, by virtue of the mount base and the front end cap, the first limit bar 4, the second limit bar 4, and the circuit board 3 are squeezed to be securely fixed with each other, which may further limit axial displacement of the circuit board 3 along the outer tube 1. In addition, the first limit bar 4 and the second limit bar 5 are aluminum bars in this implementation. Of course, it is understood that in alternative implementations, the first limit bar 4 and the second limit bar 5 may be formed of other materials.

Figure 2:
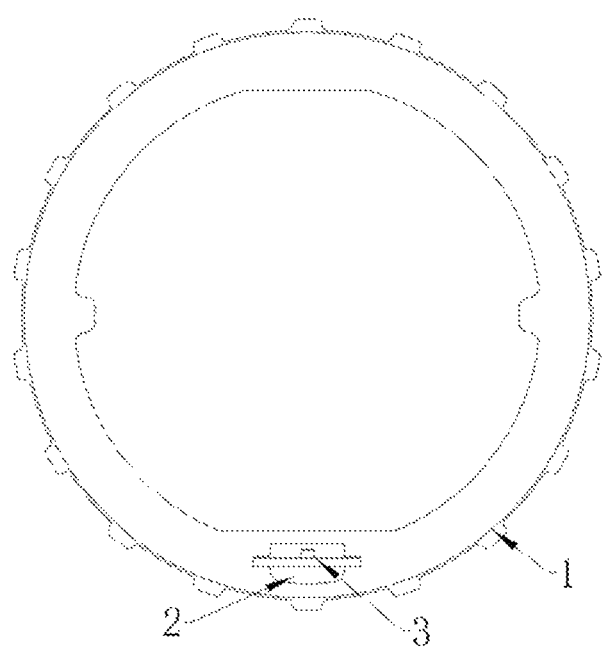
FIG. 2 is a side view of the outer tube in the first embodiment of the disclosure.
Figure 3:
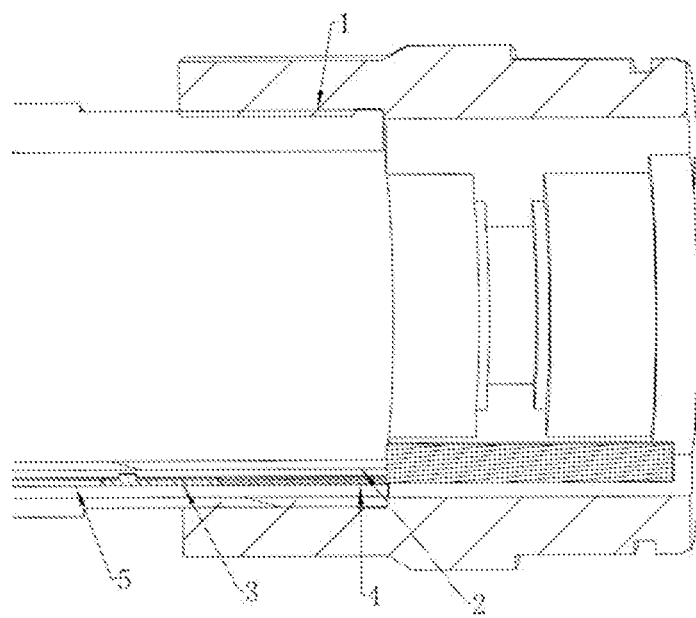
FIG. 3 is a first section view of the outer tube in the first embodiment of the disclosure.
Figure 4:
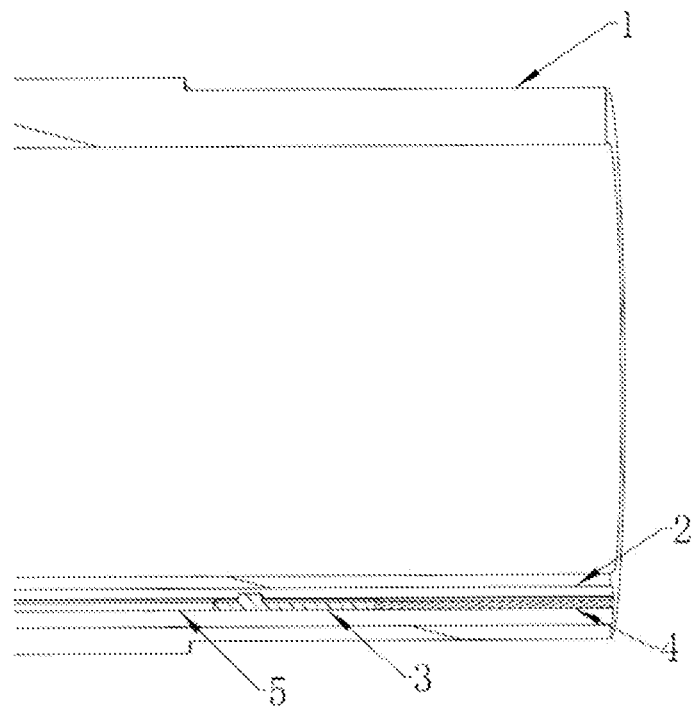
FIG. 4 is a second section view of the outer tube in the first embodiment of the disclosure.

In this embodiment, to limit radial displacement of the circuit board 3 along the outer tube 1, the overall cross-section of the cavity 2 assumes a rectangular shape, as illustrated in FIG. 2. Since the circuit board 3 has a fixed overall size, it is a flat elongated board as a whole. Various convex elements are provided on the surface of the circuit board 3, and a space for accommodating such convex elements is provided in the cavity 2 in the radial direction of the outer tube 1. To avoid radial displacement of the circuit board 3, a recessed groove for accommodating the circuit board 3 is provided at each of the two sides of the cavity 2. The recessed grooves block the circuit board 3 from radial displacement along the outer tube 1. In this way, the vibration-induced displacement of the circuit board 3, which likes results in poor signal reception and affects normal operation of the solar actuator, may be avoided. In addition, potential damages to the circuit board 3 due to vibration-induced collision between the circuit board 3 and the inner wall of the cavity 2 may also be avoided. Therefore, the recessed grooves at the two sides of the cavity 3 provide a further protection. It is noted that the profile of the cross section is the shape of the outer tube 1 presented in the side view, as illustrated in FIG. 2.

Embodiment 2

This embodiment illustrates a solar actuator. The solar actuator comprises an outer tube 1 and a circuit board 3, wherein a grease-isolating structure for storing a circuit board 3 as described in the first embodiment or other equivalent embodiments is provided in the outer tube 1, and the circuit board 3 is stored in the structure. This embodiment may isolate the circuit board 3 from the grease on the inner wall of the outer tube 1, preventing potential occurrence of a capillary act to the circuit board immersed in liquidized grease from affecting the circuit board in information feedback and Hall switch control and causing malfunction of the solar actuator. This embodiment provides certain guarantee to normal operation of the solar actuator and may improve the operating efficiency and service life thereof.

What have been described above are only specific embodiments of the disclosure. However, the technical features of the disclosure are not limited thereto. Those skilled in the art should understand that the disclose includes, but not limited to, the contents described in the embodiments. Any modification made by those skilled in the art without departing from the function and structural principle of the disclosure shall fall within the scope of the disclosure.

What is claimed is:

1. A grease-isolating structure for storing a circuit board, the storage structure being disposed in an outer tube of a solar actuator, in the outer tube being further provided the circuit board, a through-hole running axially through the outer tube being provided for the outer tube, wherein a cavity for storing the circuit board is provided on a wall of the outer tube, and the cavity and the through-hole are isolated from each other,
   a first limit bar and a second limit bar for limiting axial displacement of the circuit board along the outer tube are provided at two ends of the circuit board, respectively,
   the first limit bar and the second limit bar are aluminum bars.

2. The grease-isolating structure for storing a circuit board according to claim 1, wherein the cavity runs through the outer tube in a direction consistent with that of the through-hole.

3. A solar actuator, comprising an outer tube and a circuit board, wherein a grease-isolating structure for storing a circuit board according to claim 2 is provided in the outer tube.

4. The grease-isolating structure for storing a circuit board according to claim 1, wherein cross sections of the first limit bar and the second limit bar are sized to match with that of the cavity; and the first limit bar and the second limit bar fully fill the space at the two ends of the circuit board in the cavity.

5. A solar actuator, comprising an outer tube and a circuit board, wherein a grease-isolating structure for storing a circuit board according to claim 4 is provided in the outer tube.

6. The grease-isolating structure for storing a circuit board according to claim 1, wherein a mount base and a front end cap are provided at two ends of the outer tube, respectively; wherein two ends of the first limit bar contact the mount base and one end of the circuit board, respectively, and two ends of the second limit bar contact the front end cap and the other end of the circuit board, respectively.

7. A solar actuator, comprising an outer tube and a circuit board, wherein a grease-isolating structure for storing a circuit board according to claim 6 is provided in the outer tube.

8. The grease-isolating structure for storing a circuit board according to claim 1, wherein an overall cross-section of the cavity assumes a rectangular shape; and a recessed groove for limiting radial displacement of the circuit board along the outer tube is provided at two sides of the cavity, respectively.

9. A solar actuator, comprising an outer tube and a circuit board, wherein a grease-isolating structure for storing a circuit board according to claim 8 is provided in the outer tube.

10. The grease-isolating structure for storing a circuit board according to claim 1, wherein the cavity is sized to match with that of the circuit board, the cavity being only for storing the circuit board.

11. The grease-isolating structure for storing a circuit board according to claim 10, wherein a cover for limiting the circuit board from escaping out of the cavity is further provided for the outer tube.

12. A solar actuator, comprising an outer tube and a circuit board, wherein a grease-isolating structure for storing a circuit board according to claim 10 is provided in the outer tube.

13. A solar actuator, comprising an outer tube and a circuit board, wherein a grease-isolating structure for storing a circuit board according to claim 11 is provided in the outer tube.

14. A solar actuator, comprising an outer tube and a circuit board, wherein a grease-isolating structure for storing a circuit board according to claim 1 is provided in the outer tube.

* * * * *